United States Patent [19]

Berg

[11] 4,196,470
[45] Apr. 1, 1980

[54] METHOD AND ARRANGEMENT FOR TRANSFER OF DATA INFORMATION TO TWO PARALLELLY WORKING COMPUTER MEANS

[75] Inventor: Erik L. Berg, Rönninge, Sweden

[73] Assignee: Telefonaktiebolaget L M Ericsson, Stockholm, Sweden

[21] Appl. No.: 857,254

[22] Filed: Dec. 5, 1977

[30] Foreign Application Priority Data

Dec. 17, 1976 [SE] Sweden .................... 7614222

[51] Int. Cl.² ............................................ G06F 15/16
[52] U.S. Cl. ............................................ 364/200
[58] Field of Search ... 364/200 MS File, 900 MS File; 235/307, 306

[56] References Cited

U.S. PATENT DOCUMENTS

| | | | |
|---|---|---|---|
| 3,252,149 | 5/1966 | Weida et al. | 364/200 |
| 3,303,474 | 2/1967 | Moore et al. | 364/200 |
| 3,864,670 | 2/1975 | Inoue et al. | 364/200 |
| 3,898,621 | 8/1975 | Zelinski et al. | 364/200 |
| 3,909,795 | 9/1975 | Chang et al. | 364/200 |
| 3,913,074 | 10/1975 | Homberg et al. | 364/200 |
| 3,931,505 | 1/1976 | Sevcik | 235/307 |
| 4,020,459 | 4/1977 | Coomer | 235/307 |
| 4,021,784 | 5/1977 | Kimlinger | 364/200 |

Primary Examiner—Mark E. Nusbaum
Attorney, Agent, or Firm—Hane, Roberts, Spiecens & Cohen

[57] ABSTRACT

Data information units are registered sequentially preparatory for transfer to two computer means, each by parallel-synchronous cooperation executing one of two accordant instruction sequences. The execution of each instruction sequence is divided in numbered periods which because of demanded information transfers comprise only one information transfer each. The demand for a transfer leads to a transfer number which is established by means of the period number obtained if the computer means execute instructions belonging to corresponding periods, and by means of the higher of the two period numbers if the instructions executed at the same time do not belong to corresponding periods. A transfer signal is transmitted to one of the computer means when the associated period number is equal to the transfer number. Due to a received transfer signal, the registered data information is transferred to the respective computer means. Thus the accordance of both instruction sequences is maintained in spite of a time displacement between corresponding periods.

7 Claims, 4 Drawing Figures

4,196,470

METHOD AND ARRANGEMENT FOR TRANSFER OF DATA INFORMATION TO TWO PARALLELLY WORKING COMPUTER MEANS

BACKGROUND OF THE INVENTION

The present invention refers to a method for transferring data information units, by means of transfer instructions, to two parallelly working data processor means, each executing one of two accordant instruction sequences in corresponding periods which each, due to demanded information transfers, comprises the execution of only one transfer instruction, the demands for data transfer appearing asynchronously compared with the execution of the instruction sequences, and such time displacements occuring between corresponding periods that a transfer demand is marked during periods which are not mutually correspondent. The invention also refers to an apparatus to perform the method.

A single working data processor which is intended for process control in real time executes an instruction sequence which constitutes the control program of the process. Each of the instructions of the sequence is successively executed. Each instruction is carried out during an execution clock interval determined by clock pulses. Further, the instructions are carried out in an order which has to be flexible considering that data information units are received from the controlled process quite arbitrarily and are asynchronously related to the clock pulses but must be processed in real time. It is known in the computer art in this connection to introduce different degrees of priority, to divide the sequence into uninterruptable subsequences the last executed instruction of which is a jump instruction, to register a newly-arrived data information unit in an interrupt register, and, due to a marking of a demanded information transfer having priority, to jump to a transfer subsequence comprising a transfer instruction. By means of the transfer subsequence the presently performed sequence is interrupted, the registered data information unit is distributed and a return point for the continued sequence execution is determined. This known real time technique is described for example in the article "Design of a Microprogram Control for a Processor in an Electronic Switching System," the author of which is T. F. Storey and which is published in "The Bell System Technical Journal, February 1976, Vol. 55, No. 2, p. 183-232."

Any asynchronism between the execution clock pulses of the sequence and the data information units being received from the process is rather easily mastered by the single working data processor. The clock pulses are used to activate the interrupt register for writing or reading, and thanks to subsequences and jump instructions—as it is generally expressed by way of introduction and as will be explained below—executing periods occur. These periods include, due to a demanded information transfer, only one transfer instruction. The present invention, however, does not refer to such real-time-single working processors but proposes a method and an arrangement to transfer data information to parallelly working data processor means wherein each executor executes one instruction sequence.

The term "parallelly working" is generally known and defines the concept of two substantially identical processor means parallelly processing data information units from a single source by means of corresponding instruction sequences with the results produced by the means being continously mutually compared so that differences of the results due to equipment or program faults start a malfunction alarm. From that it follows that the working in parallel demands, for the execution of the two instruction sequences, a synchronism which absolutely comprises frequency equality of the clock pulses controlling the executions. Certainly the arrangement of delay circuits renders it possible to carry out the comparison operation in spite of a constant phase displacement between corresponding execution periods but preferably the synchronization in addition to the frequency equality should include phase coincidence as well. Concerning a doubling of processor parts in order to increase the operational reliability, there are still more known principals which demand less for the synchronism but the present invention only refers to the doubling resulting in a parallel-synchronous cooperation, which in a publication "J. Martin, Design of Real Time Computer Systems, 1967, Englewood Clifts" is designated "twin-configuration" and which is also described in the Swedish Pat. Nos. 227 356 and 369 345.

In Swedish Pat. No. 227 356 it is assumed that frequency equality and phase coincidence exist. A transfer of a data information to the twin-configuration is therefore achieved without venturing the necessary equality of the instruction sequencies in a simple way, for example by registrating the data information in parallel in the respective interrupt registers of two single working computers.

In the twin-configuration according to Swedish Pat. No. 369 345 frequency equality exists in combination with such a constant phase displacement that the so-called executive processor when executing corresponding instruction sequences always leads the so-called reserve processor. One realizes that the above mentioned arrangement of two interrupt registers each to select, when information transfer is demanded, a transfer instruction without considering the constant phase displacement results in different instruction sequences and consequently a malfunction alarm if the phase displacement is of such a high degree that a demand for transfer is marked at the same time in the two computers during non-corresponding execution periods. In this case, however, only the executive processor is fed with the undoubled data information units and, thanks to a special updating routine the equality of the instruction sequences continued after a new-arrived data information is maintained in spite of such constant phase displacement by means of processing the undoubled data information units as updating data.

In practice the hithereto discussed constant synchronization conditions do not exist but, due to tolerance limits which must be allowed, there are phase displacements slowly varying around a mean value. Even if this mean value of the phase displacements, which in the Swedish Pat. No. 227 356 corresponds to the ideal phase coincidence and in Swedish Pat. No. 369 345 corresponds to the constant phase displacement, is mastered in the above mentioned manner, said variations around a mean value are not mastered in any hithereto known twin-configuration, if the divergence from the mean value sometimes is larger than simultaneously relevant execution periods.

SUMMARY OF THE INVENTION

The proposed method and arrangement according to the invention avoid the cooperation disturbances in an arbitrary twin-configuration although the tolerance limits of the synchronization cause the phase displacement variations. As it appears from the characteristics of the claims this is achieved by allotting to the information transfers one at a time a transfer period during which the transfer instruction belonging to the transfer is executed in both data processor means.

BRIEF DESCRIPTION OF THE DRAWINGS

The invention will be described below more in detail with reference to the appended drawing, wherein.

DESCRIPTION OF THE PREFERRED EMBODIMENT

Figure 1:
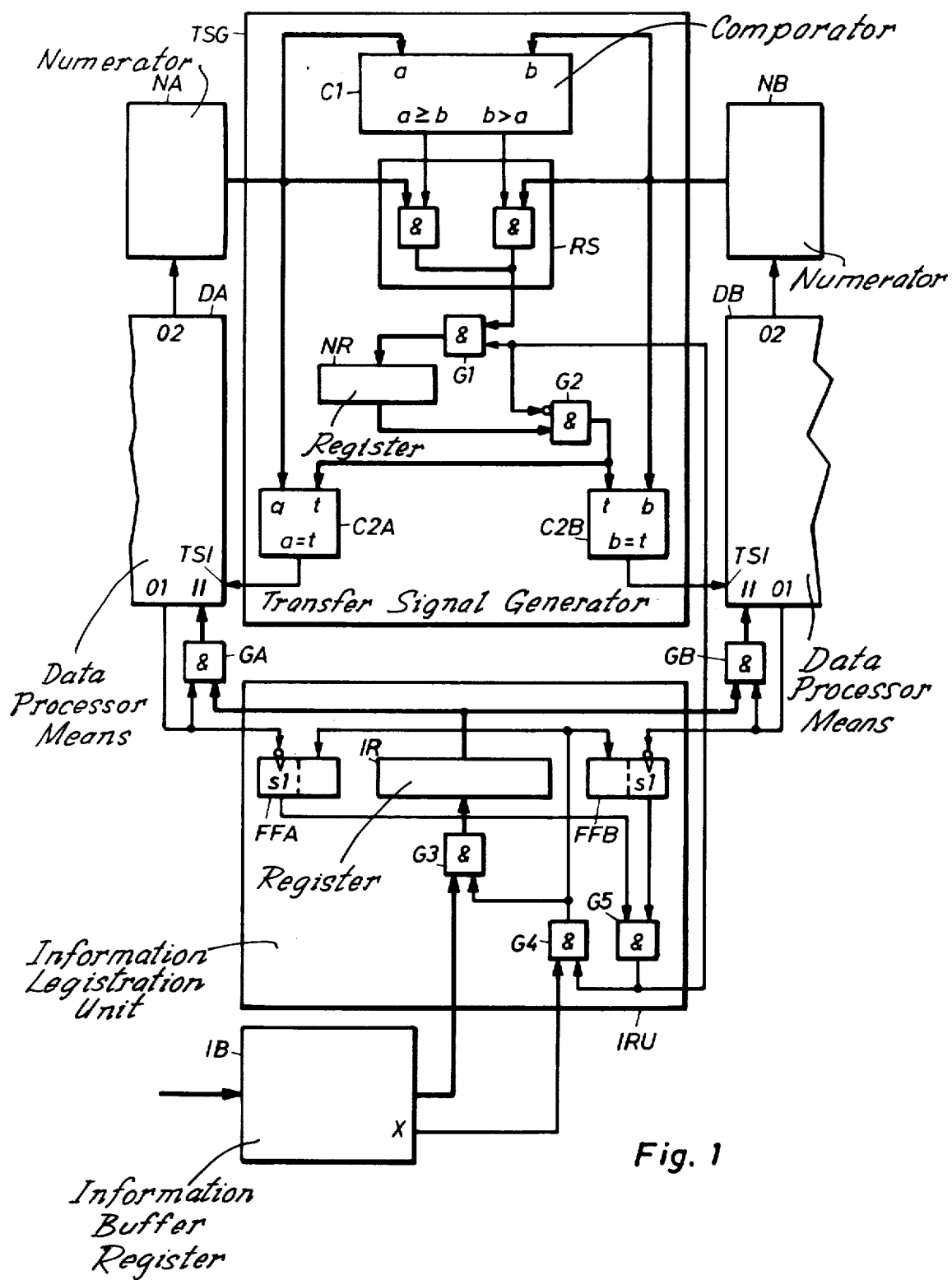
FIG. 1 shows the proposed arrangement and a buffer register from which data information groups are transferred to two parallelly working data processor means and the FIGS. 2 to 4 of which show timing diagrams of the execution of instruction sequences and the time-sharing of the information transfers.
Figure 2:
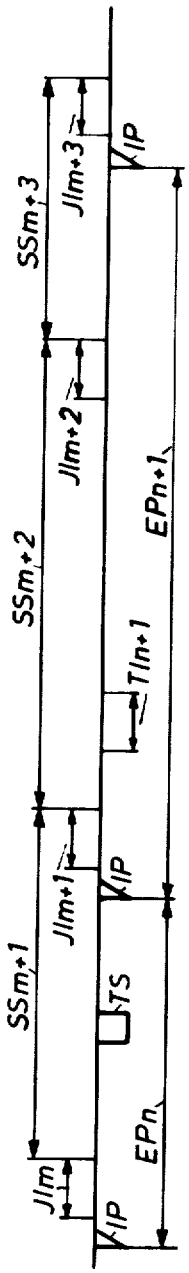

In FIG. 1 two parallelly working data processor means DA and DB are indicated. Each of these means is provided with an information input II, a transfer signal input TSI and two outputs 01 and 02. FIG. 2 is a timing diagram showing how one of the data processor means executes portions of an instruction sequence. The instructions are executed in instruction execution clock time units. The execution clock time units for jump instructions are for example designated JIm to JIm+3. The jump instructions are modifiable and each terminates one instruction subsequence each. The number in instructions of the subsequences varies, consequently different subsequence execution times SS are obtained, in FIG. 2 it is assumed that, for example, the time SSm+3< the time SSm+2.

Figure 4:
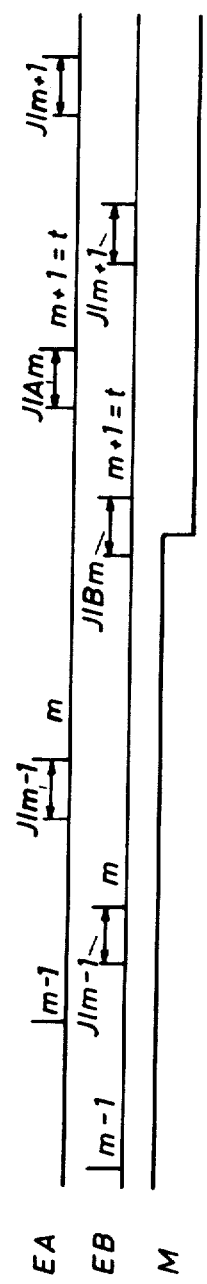

In addition to the execution clock time units for jump instructions and instruction subsequences FIG. 2 shows execution periods EPn and EPn+1. The limit between two successive periods is passed when it is too late to modify the only jump instruction being associated with this limit so that it is jumped to a transfer subsequence which comprises a transfer instruction during the execution of which the data processor means receives a unit of data information through the information input II. Such modification is initiated by means of a transfer signal TS (an interrupt) which is received on the transfer signal input TSI in connection with a demanded information transfer. It is possible but not necessary that each jump instruction is allotted a period limit. Likewise the following general definition of the manner by which the data processor means executes the instruction sequence leaves it open whether a transfer signal results in a transfer subsequence or only in the insertion of a transfer instruction between two subsequences. This definition means that a transfer signal TS which activates the transfer signal input during the execution period EPn according to FIG. 2 selects only one transfer instruction whose execution clock time unit TIn+1 is included in the transfer period EPn+1. The output 01 of the data processor means is activated during the execution clock time unit TIn+1 for the transfer instruction. Finally FIG. 2 shows indication pulses IP, which output 02 of the data processor means emits at each period limit. As a conclusion of the specification, however, with the aid of FIG. 4 a variation will be described according to which these indication pulses indicate a limit each between two successive subsequencies.

The indication pulses IP generated in the respective data processor means are received according to FIG. 1 by two numerators NA and NB respectively. The numerators are counters which are set to an equal number when the processor means begin the parallel-synchronous cooperation and which then count the number of execution periods being executed in respective processor means. A first comparator C1 in a transfer signal generator TSG compares the count numbers being accumulated by the numerators to indicate together at an arbitrary time whether the data processor means execute the two accordant instruction sequences in corresponding or non-corresponding execution period. First comparator C1 is of a conventional type, which when receiving the counting numbers a and b activates either its first or second output if a≧b or b<a respectively. The transfer signal generator TSG also comprises a reversing switch RS in order to feed a number register NR through a gate arrangement G1 with counting numbers coming either from the one or from the other of the numerators NA and NB. According to FIG. 1 the reversing switch consists of two gate arrangements, the first of which is connected to the numerator NA and to the first output of the comparator C1 and the second of which is connected to the numerator NB and to the second comparator output of the comparator. As long as the gate arrangement G1 is activated the number register NR registers the same or the larger of the counting numbers which is obtained depending on whether the two instruction sequences are executed in corresponding and non-corresponding periods, respectively. The transfer signal generator TSG also includes two second comparators C2A and C2B each having its first input connected to one of numerators and its output connected to the transfer signal input TS1 of that data processor means which feeds this numerator, and its second input connected through a gate arrangement G2 to the output of the number register NR. The comparators C2A and C2B are of a conventional type, the output of which being activated for equal input values.

FIG. 1 also shows an information buffer register IB of the known "first in-first out" or FIFO type in which data information units coming in at arbitrary times are buffer stored. The buffer register IB is provided with an indication output X which is activated if at least one information unit is stored. The data information units are transferred through a gate arrangement G3 to an information register IR in an information registration unit IRU and from there through two gate arrangements GA and GB to the information inputs II of the data processor means DA and DB. The indication output X is also connected to the information registration unit, more precisely to the first input of a gate G4 the second input of which is activated by means of a gate G5 only if the two flip-flops FFA and FFB take the same stable first state s1. This first state is set when the execution of the instruction sequence begins and when the execution of a transfer instructon is finished. To achieve this, each of the flip-flops FFA and FFB is provided with a first input which is activated by the trailing edge of a signal and which together with the control input of the respective gate arrangements GA and GB is connected to output 01 of the data processor means DA, respectively DB. The gate G4 has its output connected to gate arrangement G3 and to the second inputs of the flip-flops FFA and FFB. During the parallel-synchronous cooperation the information registration unit therefore performs the following function: On condition that the transfer of a first data information unit to the processor means is finished and that the buffer register stores a second data information unit, the second information unit is registered in the information register IR from which it is read by means of gate arrangements GA and GB, which are activated when the processor means executes a transfer instruction allotted to this second information unit.

In connection with each writing in the information register IR gate G5 of the information registration unit IRU is deactivated and remains deactivated during the whole of the associated transfer operation but is activated, at least for a short while, when a transfer operation is finished. According to FIG. 1 this operation of the gate G5 is utilized by using its logic ZEROS as marking signals, each belonging to a registration in the information register and each controlling gate arrangements G1 and G2 of the transfer signal generator TSG. Consequently a marking of an information transfer demand stops the transfer of the counting numbers to the number register NR, the contents of which during the associated transfer operation being designated as transfer number t. By means of gate arrangement G2 which is provided with an inverting input the second comparators C2A and C2B compare the instantaneous counting numbers a and b obtained from the numerators NA, NB to the transfer number only, and so two transfer signals belonging to the respective transfer operation are generated, and the data processor means DA and DB, independently of a relative phase displacement, receive separately the transfer signals during the execution period being determined by means of the transfer number t.

Figure 3:
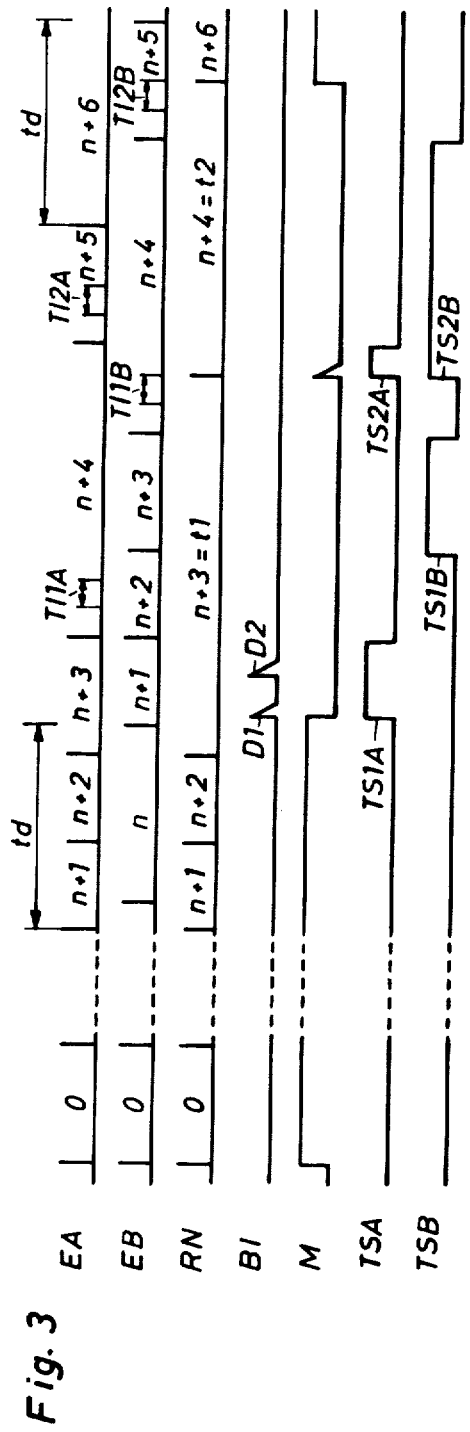

FIG. 3 contains a number of timing diagrams showing an example of how to transfer, by means of the above mentioned arrangement, data information groups to two parallel-synchronously cooperating processor means the coincident start of which, in order to execute accordant instruction sequencies, appear from coincident execution periods having the counting number 0 in the two execution timing diagrams designated EA and EB. After a certain time of operation a phase displacement td arises between execution periods with corresponding counting numbers. Such phase displacement results in that the counting numbers being registered according to the timing diagram RN in the number register until the beginning of the period being determined by means of the counting number n+3 coincide with corresponding counting numbers according to the diagram EA. A marking timing diagram M and a buffer-in timing diagram BI show that the gate G5 in the information registration unit IRU is activated until two data information units at the instants D1 and D2 come to the buffer register shortly after each other during the execution period having the counting number n+3 in the diagram EA. The first incoming information unit is immediately registered in the information register IR while the latter is buffer stored in the buffer register IB. Then n+3 becomes the transfer number t1 which belongs to the instant D1 and which is compared to the counting numbers according to the diagrams EA and EB. The comparator C2A generates, immediately after the first information registration, a transfer signal TS1A shown in a timing diagram TSA for transfer signals to the data processor means DA. By means of this transfer instruction is selected, the execution clock time unit TI1A of which is included according to the timing diagram EA in the execution period having a counting number n+4. When the numerator NB according to the timing diagram EB reaches the counting number n+3 a transfer signal TSIB is transferred according to the timing diagram TSB for transfer signals to the data processor means. DB Signal TSIB causes a transfer instruction to be executed during an execution clock time unit TI1B being shown in the timing diagram EB. During these execution clock time units TI1A and TI1B gate arrangements GA and GB respectively are activated through the outputs 01 of the processor means in order to transfer to the processor means the information unit which has come in first. According to the timing diagram M the gate G5 is activated at the end of the execution clock unit TI1B but for only a short while because the buffer register still stores the second data information unit which has come in at the instant D2 and which is now registered in the information register IR. The timing diagram RN for registered counting numbers shows that the short activation of gate G5 results in that number n+4 is registered as transfer number t2 which belongs to the second information unit having come at instant D2. According to the assumed example in FIG. 3 both numerators NA and NB contain the counting number n+4 and therefore the timing diagrams TSA and TSB show second transfer signals TS2A and TS2B with coincident leading edges. Thus transfer instructions are selected whose execution clock time units TI2A and TI2B according to the timing diagrams EA and EB are included in the respective transfer execution period having the counting number n+5. Finally the timing diagram M shows that the marking signal for the second information transfer finishes at the same time as the transfer execution clock time unit TI2B which causes according to the time diagram RN the number register to register n+6 as the instantaneously larger counting number according to the time diagrams EA and EB.

The use of the now described method and arrangement guarantees the quickest possible transfer operations and that the instruction sequences of the processor means remain accordant independent of asynchronism between the demands for information transfer and the instruction executions, and above all independent of phase dispacements between the instruction executions of the processor means. If the data processor means DA and DB according to FIG. 1 should be designed in such a way that the numerators NA and NB do not count the execution periods EP being defined by means of FIG. 2, but instead that executed subsequences are counted then the transfer number being generated in the transfer signal generator TSG is modified by means of a conventional +1-adder which is series connected to the number register NR. Then the gate arrangement G2 is superfluous because in that case it never happens that one of the comparators C2A and C2B receives accordant input signals as long as there is no demand for information transfer. That such modification due to subsequence counting is necessary is described by means of a timing diagram in FIG. 4, the reference characters of which correspond with the reference characters used in FIG. 2 and 3. It is assumed that the two numerators NA and NB according to the diagrams EA and EB have been stepped to a counting number m when according to timing diagram M a demand for transfer is marked. Without such +1-adder both transfer signals should be generated immediately. Consequently these should be modified the jump instruction which is executed by the data processor means DA and which is contained in the subsequence having the counting number m and the execution clock time unit JIAm of which is shown in the diagram EA, but for the data processor means DB it should according to timing diagram EB be too late to modify the corresponding jump instruction having an execution clock period JIBm. These jump instructions and also the subsequences which obtain the counting number m+1 should no longer correspond, that is the cooperation should be disturbed. By means of the +1-addition the jump instruction which is defined by means of the transfer number t=m+1 is changed in both processor means. However, the transfer operations become on the average longer when counting subsequences than when counting execution periods.

We claim:

1. In a system which includes two parallelly operating data processor means, said data processing means including means for executing accordant instruction sequences in corresponding time intervals which may be mutually time displaced wherein each of the instruction sequences includes one input transfer instruction which can be activated in response to an interrupt signal, the method of transferring a number of units of data information to the data processor means in response to an external demand for a data transfer to the data processor means from an external source, the demand occurring asynchronously with respect to the execution of the instruction sequences, said data transfer method comprising the steps of continuously accumulating the number of time intervals each of the data processor means is passing through in the execution of the instruction sequences, registering the unit of data information to be transferred in response to the receipt of one of the external demands, registering a count value equal to the accumulated numbers if the data processor means are processing in corresponding time intervals, registering a count value equal to the accumulated number associated with the data processor means which has executed the greater number of time intervals, if the data processing means are not processing in corresponding time intervals transferring an interrupt signal to each data processor means whenever the count of the number of time intervals executed by a data processor means has a predetermined relation with respect to said registered count value after the occurrence of a demand, and presenting the registered unit of data information to both of the data processor means.

2. The method of claim 1 wherein said predetermined relationship is equality.

3. The method of claim 1 wherein one is added to the registered count value between the registering of the count value step and the start of the transferring step.

4. The method of claim 1 further comprising the steps of buffer storing a subsequent unit of data information until the registered unit of data information has been transferred to both data processor means.

5. In a system which includes two parallelly operating data processor means, said data processing means including means for executing accordant instruction sequences in corresponding time intervals which may be mutually time displaced wherein each of the instruction sequences includes one input transfer instruction which can be activated in response to an interrupt signal, apparatus for transferring units of data information to the data processor means in response to an external demand for a data transfer to the data processor means from an external source, the demand occurring asynchronously with respect to the execution of the instruction sequences, said apparatus comprising: first and second counting means for counting the number of time intervals passed through by one and the other of the data processor means, respectively; an information registration means, connected to both data processing means, for registering one of the units of data information prior to transfer to said data processor means; a marking signal generating means for generating a marking signal in response to the receipt of an external demand for a data transfer to the data processor means; a number registration means for registering transfer values and having an input and an output; a reversing switch means having inputs connected to each of said counting means and an output, and including means for disconnecting from said output the input thereof connected to the counting means with the lower count; first and second comparator means, each of said comparator means having first and second inputs and an output for emitting an interrupt signal whenever the numbers received at said first and second inputs are equal, the output of said first comparator means being connected to one of the data processor means and a first input thereof being connected to said first counting means, the output of said second comparator means being connected to the other of the data processor means and a first input thereof being connected to said second counting means, and the second input of both of said comparator means being connected to a common terminal; and control means responsive to said marking signal generating means for alternatively connecting the output of said reversing switch means to the input of said number registration means or the output of said number registration means to said common terminal in accordance with the absence or presence of a marking signal.

6. The apparatus of claim 5 wherein said information registration means comprises an information register having an input and an output connected to both said data processor means for transmitting units of data information thereof, an information buffer means for storing units of data information for sequential presentation to the input of said information register, and a first gating means responsive to said marking signal generating means for controlling the passage of units of data information from said information buffer means to said information register; and wherein said marking signal generating means comprises a reaction gating means for controlling the operation of said first gating means and having an output connected thereto, a first input adapted to receive a signal associated with the external demand, first and second bistable flip-flop means, each having first state inputs connected to the output of said reaction gating means and second state inputs respectively connected to the one and the other data processor means, and respective outputs, a marking gating means having inputs connected to the outputs of said flip-flop means and an output connected to the second input of said reaction gating means and said first gating means.

7. The apparatus of claim 5 wherein said number registration means further comprises a unit adder for incrementing by-one values received from said counting means before transfer to said comparator means.

* * * * *